(12) United States Patent
Liu et al.

(10) Patent No.: US 8,945,382 B2
(45) Date of Patent: Feb. 3, 2015

(54) SCRAPER DEVICE FOR DISCHARGING FILTER CAKE ON FILTER PLATE OF PRESSURE FILTER

(75) Inventors: Baochang Liu, Dezhou (CN); Qianqiu Zhao, Dezhou (CN)

(73) Assignee: Jingjin Environmental Protection Co., Ltd., Dezhou (CN)

( * ) Notice: Subject to any disclaimer, the term of this patent is extended or adjusted under 35 U.S.C. 154(b) by 0 days.

(21) Appl. No.: 13/818,169

(22) PCT Filed: Jul. 5, 2011

(86) PCT No.: PCT/CN2011/001108
§ 371 (c)(1),
(2), (4) Date: Feb. 21, 2013

(87) PCT Pub. No.: WO2012/129744
PCT Pub. Date: Oct. 4, 2012

(65) Prior Publication Data
US 2013/0145568 A1   Jun. 13, 2013

(30) Foreign Application Priority Data

Mar. 31, 2011   (CN) .......................... 2011 1 0080104

(51) Int. Cl.
| B01D 25/32 | (2006.01) |
| B08B 1/00 | (2006.01) |
| B01D 25/164 | (2006.01) |
| B01D 25/38 | (2006.01) |
| B01D 25/12 | (2006.01) |

(52) U.S. Cl.
CPC .............. *B08B 1/005* (2013.01); *B01D 25/164* (2013.01); *B01D 25/38* (2013.01); *B01D 25/124* (2013.01)

USPC ............ 210/225; 210/231; 210/408; 15/93.4; 15/246

(58) Field of Classification Search
None
See application file for complete search history.

(56) References Cited

U.S. PATENT DOCUMENTS

| 1,959,491 | A | * | 5/1934 | Moran | 210/413 |
| 3,637,082 | A | * | 1/1972 | Bentzien | 210/225 |
| 7,445,123 | B1 | * | 11/2008 | Chiou | 210/415 |
| 2003/0189015 | A1 | * | 10/2003 | Kaltchev | 210/791 |

* cited by examiner

*Primary Examiner* — Katherine Zalasky
*Assistant Examiner* — Kara Graber
(74) *Attorney, Agent, or Firm* — Matthias Scholl P.C.; Matthias Scholl

(57) ABSTRACT

A scraper device discharges a filter cake on a filter plate of a pressure filter, which includes fixed bracket and movable carriage parts, and hoist rack and scraper parts. The fixed bracket part has transverse and vertical bracket beams. The movable carriage part has a movable carriage base, bottom and upper transverse beams, and an upright column. The hoist rack part, mounted in the movable carriage, includes upper and bottom transverse beams of the hoist rack, which are connected by an upright column of the hoist rack. A hoist slide plate connects with a connection plate of the hoist rack, and the hoist slide plate is movably connected to a chain. Scrapers are placed at both sides of the filter plate, and position limiters are placed in the movable carriage part and the hoist rack part. The position limiters are connected to clamping and unclamping proximity switches.

6 Claims, 4 Drawing Sheets

SCRAPER DEVICE FOR DISCHARGING FILTER CAKE ON FILTER PLATE OF PRESSURE FILTER

FIELD OF THE INVENTION

The invention relates to a filter cake removing device for filter plates of a filter press, and more particularly to a scraper device for filter plates of a filter press.

BACKGROUND OF THE INVENTION

A filter press is filtration equipment in solid-liquid separation industry, and a chamber forming filter plate is a main component of the filter press. A typical filter cycle is as follows: liquid-solid slurries are first transported from a feed pump to filter chambers formed by filter plates, then, particles in slurries are intercepted in filter chambers by filter cloth or other filter medium fixed on filter plates, while filtrate is output via outlets, leaving filter cakes in filter chambers, finally, filter plates are separated individually by a dragging device of the filter press, and filter cakes automatically fall off, thus, a cycle of filter is accomplished.

With the development of solid-liquid separation industry and the wide use of filter technologies, during the separation of filter plates after filtration, some filter cakes are so sticky that they tend to stick to filter chambers and fall on sealing surfaces. Thus, workers can only use high pressure water to wash away these filter cakes, which, however, enters into drainage pipes and are likely to block drainage pipes that a second filter of the filter cake is required, resulting in energy loss and increase of production cost. Furthermore, filter chambers tend to leak slurries due to stuck filter cakes on sealing surfaces of filter plates, thus, the objective of the filtering cannot be achieved. Conventional methods for removal of filter cakes on the sealing surfaces of filer plates and in filter chambers are dependent on manual operation, which not only consumes workers' time and energy, but also damages the filter cloth and increases the production cost, resulting in prolonged filter cycle, and in turn affecting the filter efficiency and the production.

SUMMARY OF THE INVENTION

In view of the above-described problems, it is one objective of the invention to provide a scraper device for filter plates of a filter press.

Technical schemes of the invention are summarized below. A scraper device for filter plates of a filter press comprises a fixed frame and a movable frame. The fixed frame is a framed structure comprising a support crossbeam and a main beam. The movable frame is a framed structure comprising a base, a lower frame crossbeam, an upper frame crossbeam, and a column. The scraper device further comprises a lifting frame and a scraper assembly; the movable frame further comprises a gear motor connected to a gear through a main axle, the gear fits with a gear rack which is disposed on the main beam, an upper end of the column of the movable frame is provided with a gear motor which is connected to a chain gear through a main axle of the chain gear, the chain gear fits with a chain. The lifting frame is fixed in the movable frame and comprises an upper crossbeam, and a lower crossbeam, both of which are connected with a column. The lifting frame further comprises a connecting plate which is connected with a slide plate, and the slide plate is in flexible connection with the chain. The scraper assembly comprises a cylinder assembly and a scraper. The cylinder assembly is connected with the scraper which is disposed on both sides of a filter plate. The movable frame and the lifting frame are provided with a limiting device which is connected to a clamping proximity switch and an unclamping proximity switch.

The cylinder assembly is fixed on a cylinder saddle that is connected to a cylinder base, cylinder bases are connected via a crossbeam of a scraper holder; the cylinder assembly is connected to a movable clamping plate via a cylinder connecting block, the movable clamping plate is fixed on a fixed clamping plate fixed on the cylinder base, and the movable clamping plate is provided with the scraper holder supporting the scraper.

A flange of scraper holder which is disposed on an upper end of the cylinder base is connected to a flange of the lifting frame disposed on a bottom of the column of the lifting frame.

The base of the movable frame is provided with pulleys.

The fixed frame comprises support legs connected to a thrust plate and an oil cylinder saddle of the filter press; and further comprises a chain stand comprising a drag chain and an air pipe.

The scraper is made of stainless steel or reinforced polypropylene.

Advantages of the invention are summarized below: filter cakes stuck on the sealing surfaces of the filter plates and in the filter chambers are clearly removed by the scraper device for the filter plates of the filter press of the invention, which not only improves the recovery rate of the filter cakes, the performance of the sealing, and the processing speed, but also reduces the labor intensity in a large degree, shorten the cycle period of solid-liquid slurries, and prolonged the use age of filter cloth. Thus, the production cost is lowered, and the filter proficiency is improved. Furthermore, the device is automatically controlled by programmable logic controller (PLC) program, which makes the operation much simpler and safer.

Figure 1:
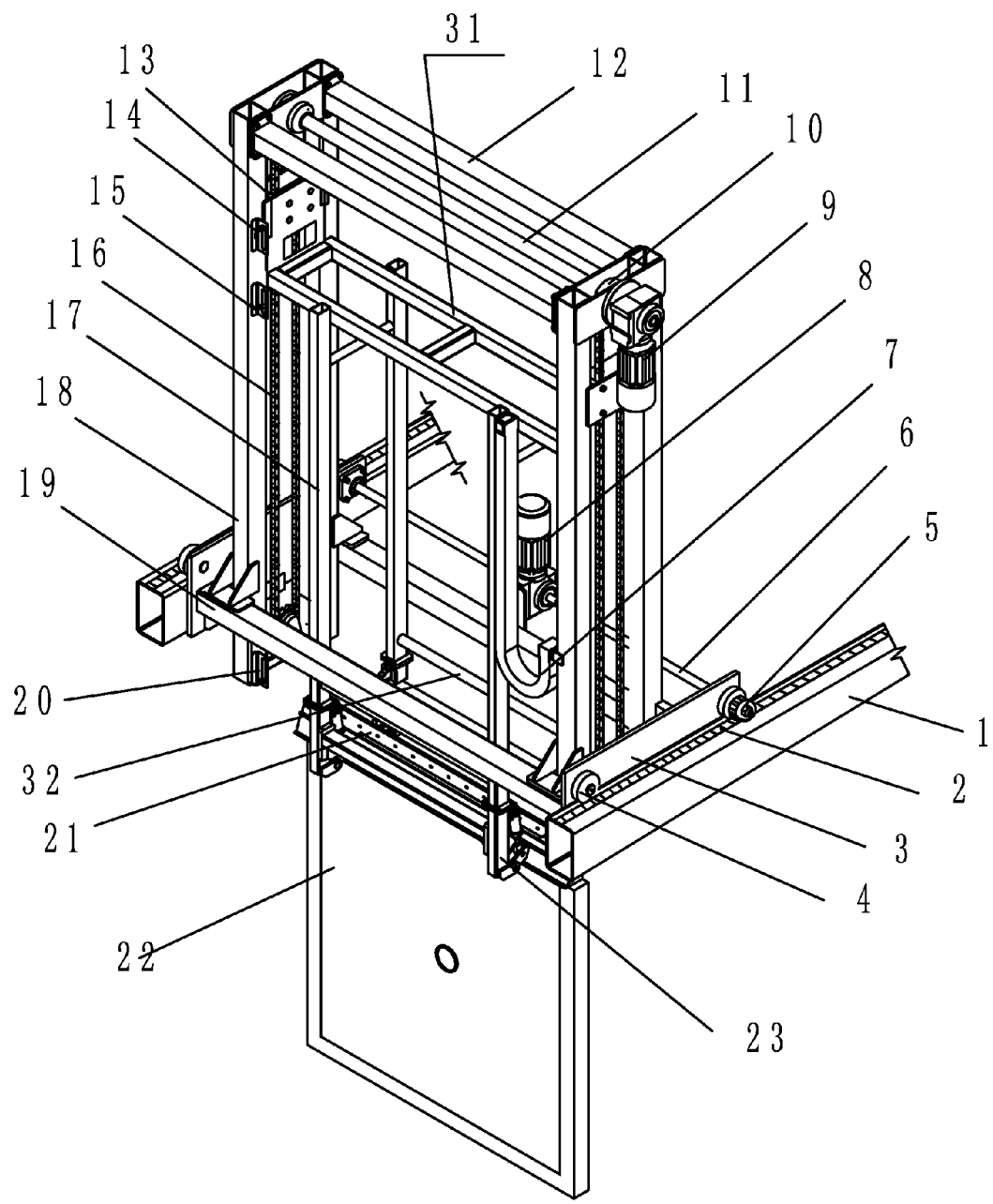
FIG. 1 is a schematic diagram of a scraper device for filter plates of a filter press according to one embodiment of the invention.

In the drawings, the following reference numbers are used: 1. Main beam; 2. Gear rack; 3. Base; 4. Pulley; 5. Gear; 6. Main axle of movable frame; 7. Drag chain; 8. Gear motor of movable frame; 9. Gear motor of lifting frame; 10. Chain gear; 11. Main axle of chain gear; 12. Upper frame crossbeam; 13. Slide plate; 14. Limiting device; 15. Clamping proximity switch; 16. Chain; 17. Column of lifting frame; 18. Column of movable frame; 19. Lower frame crossbeam; 20. Unclamping proximity switch; 21. Scraper; 22. Filter plate; 23. Cylinder base; 24. Cylinder assembly; 25. Cylinder connecting block; 26. Pin roll of connecting block; 27. Pin roll of clamping plate: 28. Movable damping plate: 29. Fixed clamping plate; 30. Flange of lifting frame; 31. Upper crossbeam of lifting frame; 32. Lower crossbeam of lifting frame; 33. Chain hole; 34. Anchor pin; 35. Connecting plate of lifting frame; 36. Scraper holder; 37. Flange of scraper holder; 38. Crossbeam of scraper holder; 39. Cylinder saddle; 40. Pin roll of cylinder.

DETAILED DESCRIPTION OF THE EMBODIMENTS

The invention is explained in further detail below with reference to the attached drawings.

Figure 2:
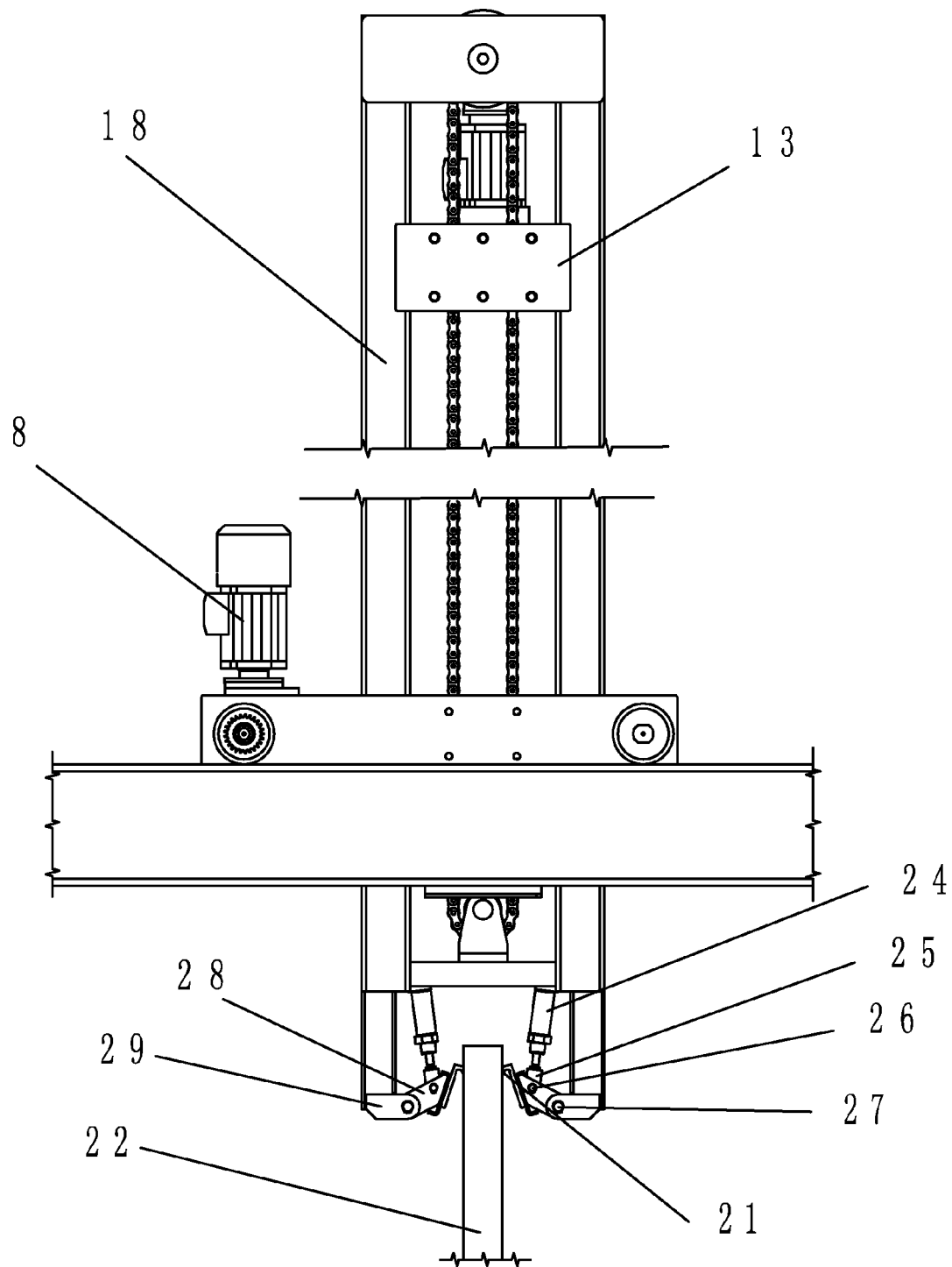
FIG. 2 is a side view of FIG. 1.
Figure 3:
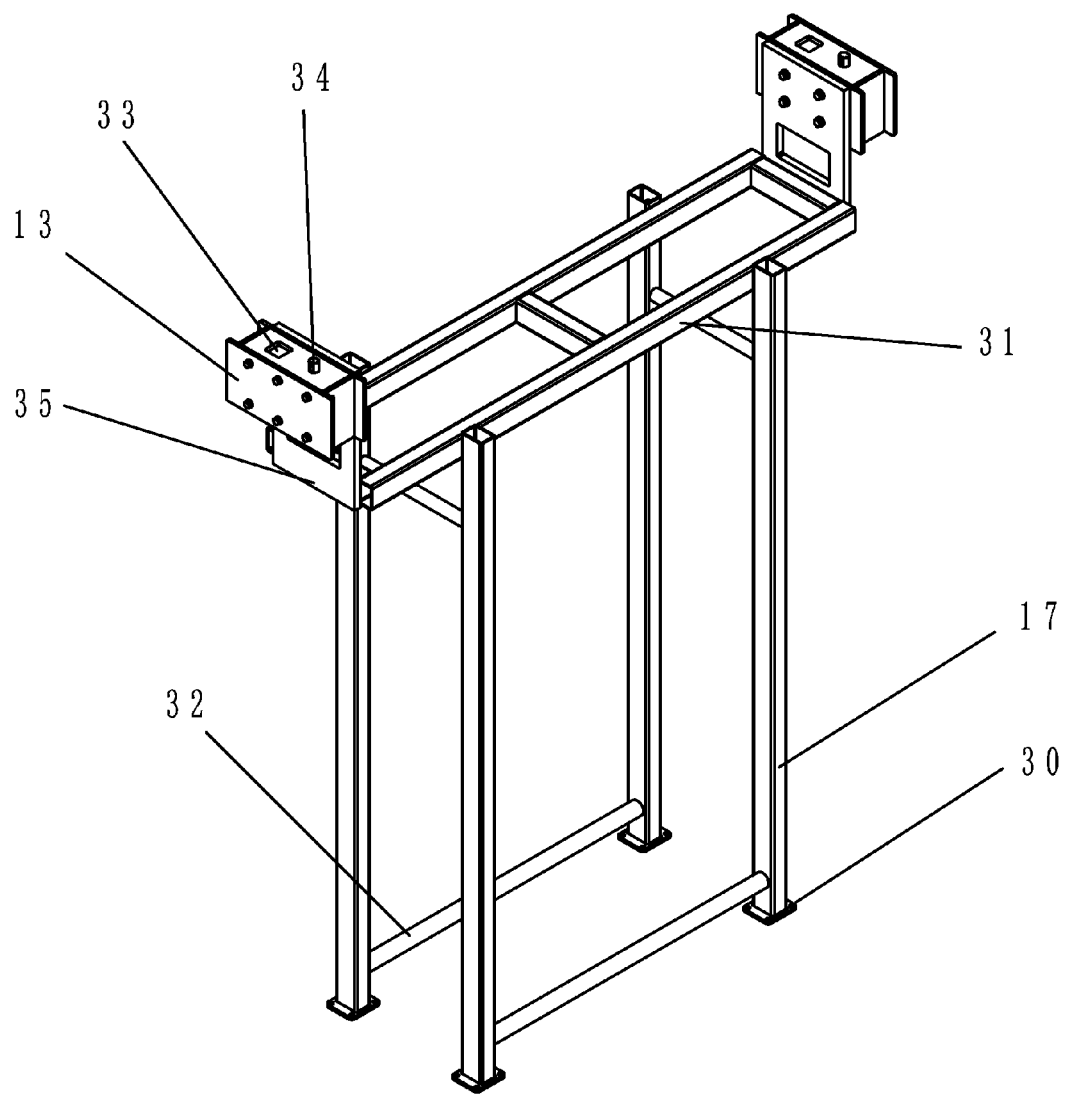
FIG. 3 is a schematic diagram of a lifting frame of FIG. 1.
Figure 4:
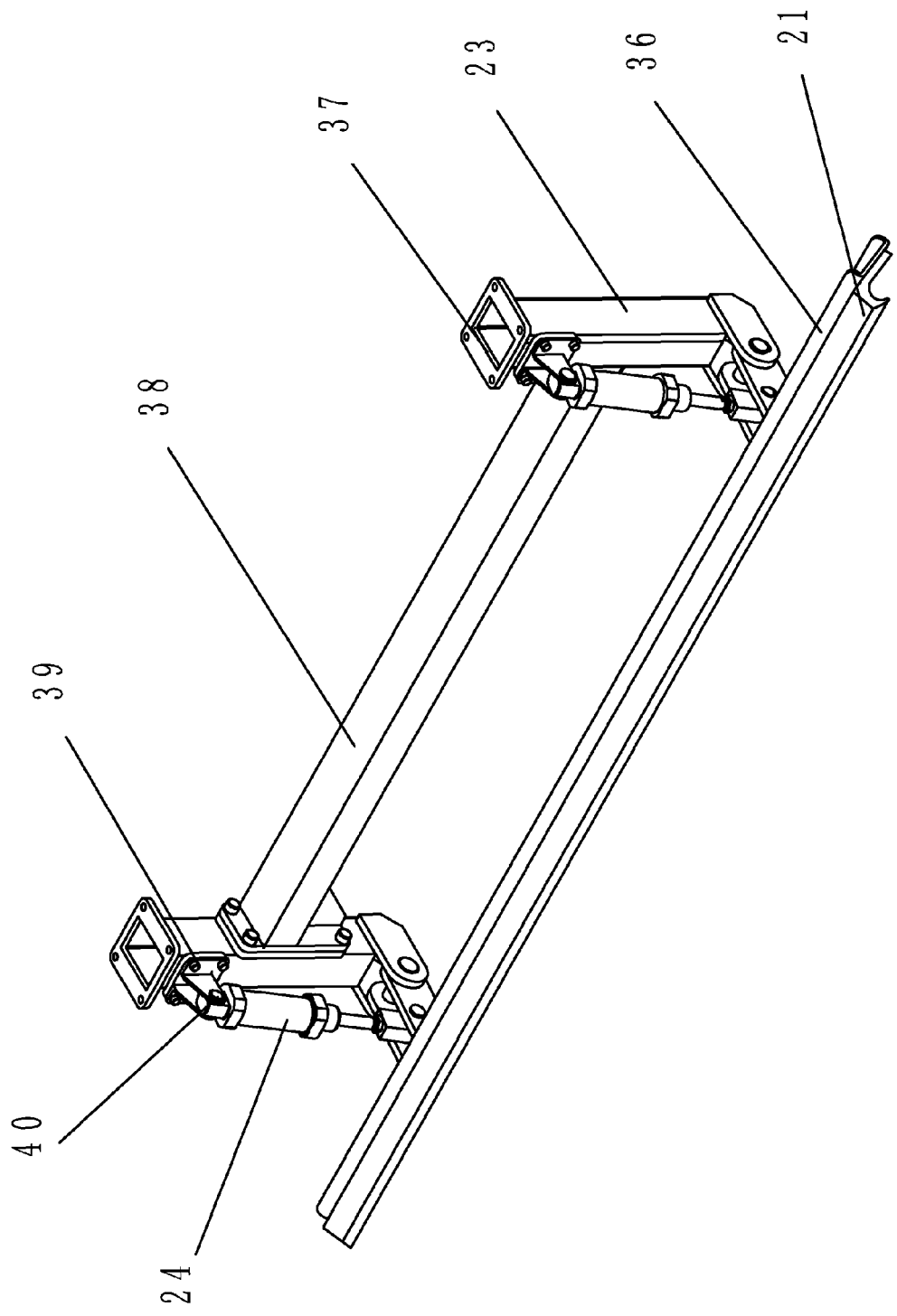
FIG. 4 is a schematic diagram of a scraper fixed on a lifting frame of FIG. 1.

As shown in FIGS. 1-4, a scraper device for filter plates of a filter press comprises a fixed frame and a movable frame. The fixed frame is a framed structure comprising a support crossbeam and a main beam 1, which can be assembled by welding. A gear rack 2 which fits with a gear 5 is disposed on the main beam 1. One side of the main beam 1 is provided, with a chain stand comprising an air pipe and a drag chain 7. The drag chain 7 contains an air supply and is disposed on a side of a column 18 of the movable frame.

The movable frame is a framed structure comprising a base 3, a lower frame crossbeam 19, an upper frame crossbeam 12, and the column 18 of the movable frame. The column 18 of the movable frame is fixed on the base 3 of the movable frame and connected to the upper frame crossbeam 12 and the lower frame crossbeam 19. The movable frame further comprises a gear motor 8 connected to the gear 5 through a main axle 6. The gear 5 fits with the gear rack 2 which is disposed on the main beam. An upper end of the column 18 of the movable frame is provided with a gear motor 9 of a lifting frame is connected to a chain gear 10 via a main axle 11 of the chain gear. The chain gear 10 fits with a chain 16. The movable frame is a sectional steel square tube made of carbon structural steel Q235-B and can be assembled by welding.

The lifting frame is fixed in the movable frame and comprises an upper crossbeam 31, and a lower crossbeam 32, both of which are connected with a column 17 of the lifting frame. The lifting frame further comprises a connecting plate 35 which is connected with a slide plate 13, and the slide plate 13 is in flexible connection with the chain 16 via a chain hole 33 on the slide plate 13. Both ends of the slide plate 13 are connected to the chains 16 via anchor pins 34. The lifting frame is a sectional steel square tube made of carbon structural steel Q235-B and can be assembled by welding.

A scraper assembly comprises a cylinder assembly 24 and a scraper 21. The cylinder assembly 24 is connected with the scraper 21 which is disposed on both sides of a filter plate 22.

The cylinder assembly 24 is fixed on a cylinder saddle 39 via to pin roll 40 of the cylinder. The cylinder saddle 39 is connected to a cylinder base 23, cylinder bases 23 are connected via a crossbeam 38 of a scraper holder, which is made of carbon structural steel Q235-B and can be assembled by welding. The cylinder assembly 24 is connected to a movable clamping plate 28 via a cylinder connecting block 25, and the connection between the cylinder connecting block 25 and the movable clamping plate 28 is accomplished by a pin roll 26 of the cylinder connecting block. The movable clamping plate 28 is fixed on a fixed clamping plate 29 on the cylinder base 23 via a pin roll 27 of the damping plate. The movable clamping plate 28 is provided with a scraper holder 36 supporting the scraper 21. The scraper holder 36 is made of carbon structural steel Q235-B, while the scraper 21 is made of stainless steel or reinforced polypropylene, and fixed on the scraper holder 36 via screw bolts.

The movable frame and the lifting frame are provided with a limiting device 14 which is connected to a damping proximity switch 15 and an unclamping proximity switch 20.

A flange 37 of the scraper holder which is disposed on an upper end of the cylinder base 23 is connected to a flange 30 of the lifting frame disposed on a bottom of the column 17 of the lifting frame.

The base 3 of the movable frame is provided with pulleys 4.

The fixed frame comprises support legs, each having a flange on the base thereof and being connected to a thrust plate and an oil cylinder saddle of the filter press, the material is channel steel or sectional steel square tube made of carbon structural steel Q235-B.

The start of the removal of filter cakes of the filter press is controlled by the PLC program. One side of the movable frame is provided with the crossbeam having the proximity switch, once being connected with a screw bolt of a handle of a filter plate, the proximity switch sends out a signal, which starts the gear motor 8 of the movable frame to drive the movable frame to the position of the handle of the filter plate via the gear, then the gear motor 8 of movable frame stops. Thereafter, the gear motor 9 of the lifting frame drives the chain gear 10 which in turn drives the chain 16, thus, the lifting frame descends via the slide plate 13, and does not stop until reaching the position of the limiting device 14. After that, the speed of the gear motor 9 of the lifting frame is adjusted to 300-600 mm/s, then, a piston rod of the cylinder assembly 24 extends the scraper 21 which clamps both sides of the filter plate, and the clamping pressure of the cylinder assembly 24 is 0.2 Pa (Optionally, the pressure can be adjusted according to qualities of different filter plates). As the gear motor 9 of the lifting frame descends, the scraper 21 scraps filter cakes off from the sealing surface and the filter chamber; when descending to the position of the unclamping proximity switch, the gear motor 9 of lining frame stops, then, the piston rod of the cylinder assembly 24 retracts the scraper 21 from both sides of the filter plate 22, thereafter, the lifting frame ascends to the original position, and the removal of one filter plate is accomplished. Consequently, a dragging device pulls a second filter plate to the position of the proximity switch of the movable frame, in such a way, the scraper 21 in turn scrapes filter cakes off from the filer plates and sealing surface.

The invention claimed is:

1. A scraper device for filter plates of a filter press, the scraper device comprising a fixed frame and a moveable frame; the fixed frame being a framed structure comprising a support crossbeam and a main beam; and the movable frame being a framed structure comprising a base, a lower frame crossbeam, an upper frame crossbeam, and a first column; wherein:

the scraper device further comprises a lifting frame and a scraper assembly;

the movable frame further comprises a gear motor connected to a gear through a first main axle, the gear fits with a gear rack which is disposed on the main beam, an upper end of the first column is provided with a gear motor of the lifting frame which is connected to a chain gear through a second main axle of the chain gear, the chain gear fits with a chain;

the lifting frame is connected to the movable frame and comprises an upper crossbeam, and a lower crossbeam, both of which are connected with a second column; the lifting frame further comprises a connecting plate which is connected with a slide plate, and the slide plate is in flexible connection with the chain; and the scraper assembly comprises two scrapers and four cylinder assemblies, each cylinder assembly comprising a piston rod; the scrapers are disposed each on one side of a filter plate and are connected each to two of the piston rods of the cylinder assemblies; and the scrapers are controlled by the cylinder assemblies to move towards or away from each other whereby one of the filter plates is clamped or unclamped by the scrapers.

2. The scraper device of claim 1, wherein the scraper device further comprises four cylinder supports; each cylinder support comprises a base part and two protruding parts extending from the base part; each cylinder assembly is fixed between the two protruding parts of one of the cylinder supports, the cylinder supports are connected each to one of the cylinder bases, and the cylinder bases are connected via a crossbeam of a scraper holder; each cylinder assembly is connected to a movable clamping plate via a cylinder connecting block, the movable clamping plate is fixed on a fixed clamping plate fixed on one of the cylinder bases, and the movable clamping plate is provided with the scraper holder supporting the scraper.

3. The scraper device of claim 1, wherein the base of the movable frame is provided with pulleys.

4. The scraper device of claim 1, wherein the scrapers are stainless steel or reinforced polypropylene.

5. The scraper device of claim 1, wherein:
said lifting frame comprises four said second columns each comprising an upper end and a lower end disposed opposite to the upper end, two said upper crossbeams each comprising a first end and a second end disposed opposite to the first end, two said lower crossbeams, and two said connecting plates;
said upper crossbeams are connected respectively between the upper ends of a first and a second of said second columns and between the upper ends of a third and a fourth of said second columns;
said lower crossbeams are connected respectively between the lower ends of said first and said second of said four second columns and between the lower ends of said third and said fourth of said four second columns;
said two connecting plates are connected respectively between the first ends of said two upper crossbeams and between the second ends of said two upper crossbeams; and
said four cylinder assemblies are connected each to one of said second columns;
whereby each cylinder assembly is separated from the other cylinder assemblies and said scrapers are not directly connected to each other.

6. A scraper device for a filter plate of a filter press, the scraper device comprising:
a fixed frame comprising two main beams;
a movable frame comprising two bases, a lower frame crossbeam, and four first columns, each comprising an upper end and a lower end disposed opposite to the upper end; and
a lifting frame comprising four second columns, each second column comprising an upper end and a lower end disposed opposite to the upper end; two upper crossbeams each comprising a first end and a second end disposed opposite to the first end; two lower crossbeams; two connecting plates; and two slide plates, each slide plate comprising an upper end, a lower end, and two anchor pins disposed respectively at the upper end and at the lower end;
a scraper assembly comprising two scrapers and four cylinder assemblies, each cylinder assembly comprising a first end, a second end opposite to the first end, and a piston rod disposed at the second end; and
two gear racks; two gears; two chain gears; two chains; four cylinder bases; four fixed clamping plates; four first pin rolls; four moveable clamping plates; and four second pin rolls;
wherein:
said two main beams are parallel to each other;
the lower ends of a first and a second of said four first columns are fixed to a first of said two bases, and the lower ends of a third and a fourth of said four first columns are fixed to a second of said two bases; said two upper frame crossbeams are parallel to each other, and are connected respectively between said first and said third of said four first columns and between said second and said fourth of said four first columns;
said two upper crossbeams are connected respectively between the upper ends of a first and a second of said four second columns and between the upper ends of a third and a fourth of said four second columns; said two lower crossbeams are connected respectively between the lower ends of said first and said second of said four second columns and between the lower ends of said third and said fourth of said four second columns; said two connecting plates are connected respectively between the first ends of said two upper crossbeams and between the second ends of said two upper crossbeams, and said two slide plates are disposed each on one of said two connecting plates;
said two gear racks are disposed each on one of said two main beams; and said two gears are engaged each with one of said two gear racks; and said two bases are disposed each on one of said two gear racks through one of said two gears; whereby said movable frame is movable along said two main beams;
said two chain gears are disposed respectively between the upper ends of said first and said second of said four first columns and between the upper ends of said third and said fourth of said four first columns; said two chains are engaged each with one of said two chain gears; and said two slide plates are connected each to one of said two chains through said anchor pins; whereby said lifting frame is moveable upward and downward with respect to said movable frame; and
said four cylinder bases are connected each to the lower end of one of said four second columns; said four fixed clamping plates are fixed each to one of said four cylinder bases; each of said four moveable clamping plates is connected to one of said four fixed clamping plates through one of said four first pin rolls, and is pivotable around said one of said four first pin rolls; the first ends of said four cylinder assemblies are connected each to one of said four cylinder bases; said piston rods of said four cylinder assemblies are connected each to one of said four moveable clamping plates through one of said four second pin rolls, each piston rod is movable away from or towards the first end of each cylinder assembly and is pivotable around said one of said four second pin rolls; and said two scrapers are connected each between two of said four moveable clamping plates, and are parallel to said lower frame crossbeam of said moveable frame; whereby said two scrapers are movable towards or away from each other for clamping or unclamping the filter plate of the filter press.

* * * * *